Feb. 20, 1951 R. M. COLE 2,542,752
DEHYDRATION OF ACROLEIN BY STRATIFICATION
AND DISTILLATION
Filed May 27, 1949
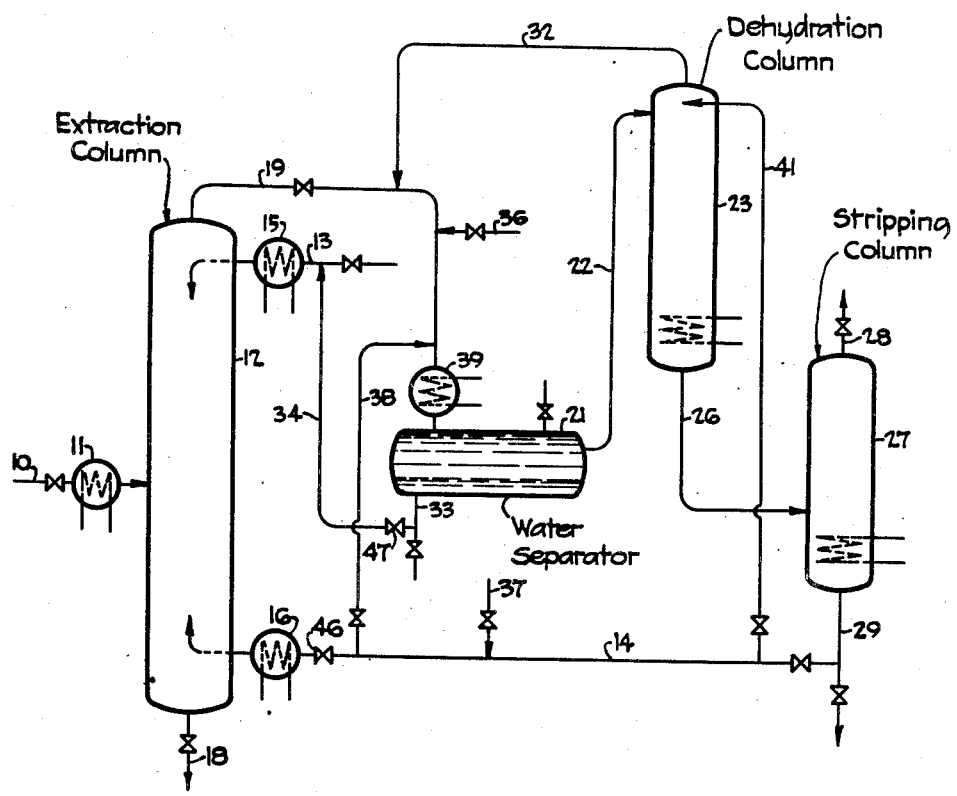
Inventor:
Robert M. Cole
By E. Walter Nash
his Agent Patented Feb. 20, 1951

2,542,752

UNITED STATES PATENT OFFICE 2,542,752

DEHYDRATION OF ACROLEIN BY STRATIFICATION AND DISTILLATION

Robert M. Cole, Oakland, Calif., assignor to Shell Development Company, San Francisco, Calif., a corporation of Delaware Application May 27, 1949, Serial No. 95,727

16 Claims. (Cl. 202—60)

This invention relates to the dehydration of acrolein.

The production of anhydrous acrolein by methods disclosed heretofore is often rendered impractical by the complexity and cost of operative steps involved or the high acrolein loss unavoidably encountered therein. Water mixed with the acrolein may be a by-product formed during acrolein production or it may have been admixed with the acrolein subsequent to its production, for example, by direct cooling of acrolein-containing reaction products by water addition or in a purification step involving contact of the acrolein with added water. The substantially complete removal of water from acrolein is complicated by the fact that water and acrolein form azeotropic mixtures.

It is an object of the present invention to provide an improved process for the more efficient removal of water from aqueous acrolein with a minimum of operative steps in the absence of any substantial acrolein loss. A particular object of the invention is the provision of an improved process enabling the more efficient recovery of substantially anhydrous acrolein from the acrolein-containing raffinates obtained in treating processes wherein crude acrolein is contacted with water in the presence of a hydrocarbon solvent. Other objects and advantages of the invention will become apparent from the following detailed description thereof.

In accordance with the invention, acrolein is recovered in substantially anhydrous state from an aqueous acrolein charge with a minimum of operative steps, in the absence of any substantial loss of acrolein, by contacting the aqueous acrolein with a hydrocarbon solvent at a temperature of from about 0° C. to about 30° C. in a stratification zone, thereby forming a water phase and an aqueous acrolein-containing hydrocarbon phase in said stratification zone, the ratio of water to acrolein in said aqueous acrolein-containing hydrocarbon phase being substantially less than that in the aqueous acrolein charge and that in the water-acrolein azeotrope, distilling the aqueous acrolein-containing hydrocarbon phase in a first distillation zone thereby forming a vapor fraction comprising water and acrolein and a substantially anhydrous liquid fraction comprising acrolein and hydrocarbon solvent in said first distillation zone, passing said vapor fraction from the first distillation zone to the stratification zone, and distilling substantially anhydrous acrolein from said liquid fraction separated in said first distillation zone.

In order that the invention may be more fully understood it will be described in detail hereinafter with reference to the attached drawing wherein the single figure illustrates one form of apparatus suitable for carrying out the process of the invention.

Aqueous-acrolein to be dehydrated in accordance with the invention may be obtained from any suitable source. The process of the invention is applied with particular advantage to the recovery of acrolein in anhydrous form from acrolein-containing raffinates obtained in treating processes wherein crude acrolein is contacted with water in the presence of a hydrocarbon solvent such as, for example, that described and claimed in co-pending application Serial No. 176,854, filed July 31, 1950. In its application to the dehydration of such an aqueous acrolein raffinate the same hydrocarbon solvent employed in the treating process yielding the raffinate is used as solvent in the dehydration in accordance with the present invention. Thus, referring to the drawing an aqueous acrolein-containing raffinate to be dehydrated is formed in the treating process of the co-pending application by passing crude acrolein, such as, for example, acrolein-containing hydrocarbon oxidation products obtained by the catalytic oxidation of propylene, through valved line 10 containing suitable cooling means, such as, a heat exchanger 11, into an extraction zone, comprising an extraction column 12. Water is introduced into column 12 at an upper part thereof by means of a valved line 13. A hydrocarbon solvent, for example, an aromatic hydrocarbon such as xylene, is introduced into column 12 at a lower part thereof by means of valved line 14. The temperature within column 12 is maintained below about 30° C. by suitable means, such as, for example, coolers 11, 15 and 16, and optionally by additional temperature controlling means not shown in the drawing. Under the above defined conditions, a raffinate phase consisting essentially of acrolein, xylene and a minor amount of water, and an extract phase consisting essentially of water containing saturated impurities are formed within column 12. The water phase is withdrawn from column 12 by means of valved line 18 and eliminated from the system. The aqueous acrolein-containing raffinate phase is withdrawn from column 12 by means of valved line 19.

The raffinate phase comprising acrolein and xylene thus drawn from column 12 through valved line 19 will contain water in a substantial amount which will vary in accordance with operating conditions employed in column 12. The ratio of water to acrolein therein will often exceed that of the acrolein-water azeotrope. It has been found that a substantial amount of the water contained in the hydrocarbon-acrolein mixture may be removed by subjecting the mixture to stratification at a temperature below about 30° C. Accordingly the aqueous acrolein-containing xylene stream is passed from line 19 into a stratification zone, such as, for example, a chamber 21 maintained at a low temperature. Within chamber 21, the aqueous acrolein-xylene mixture is maintained at a temperature below about 30° C. and preferably in the range of from about 0° C. to about 20° C. Within this temperature range stratification within chamber 21 will result in the formation of a lower liquid layer consisting essentially of water and a supernatant layer consisting essentially of a mixture of xylene and acrolein still containing a certain amount of water. The ratio of water to acrolein in the supernatant layer will be substantially below that in the charge to chamber 21 and substantially below that of the acrolein-water azeotrope. At temperatures of 0° C. and 20° C. the water content of an aqueous xylene-acrolein mixture containing 2.3% water based on hydrocarbon-free acrolein is readily reduced to about 0.71% and 0.96% by weight, respectively, based on hydrocarbon-free acrolein. The further substantially complete removal of such small amounts of water by methods generally employed heretofore is often a costly procedure.

In accordance with the present invention substantially all water is removed from the supernatant xylene-acrolein layer separated in chamber 21 by passing the supernatant layer through line 22 into a first distillation zone comprising dehydration column 23. Within column 23 the aqueous hydrocarbon-acrolein stream is distilled to remove substantially all its water content overhead as the water-acrolein azeotrope. The water-acrolein azeotrope will comprise 2.7% by weight of water at standard conditions. The substantially complete removal of the last traces of water from the xylene-acrolein stream necessitates the taking of considerable proportion of acrolein overhead. The separation of a substantial amount of the water, originally present in the charge, within the chamber 21, reduces drastically the quantity of acrolein which must be taken overhead within column 23. In the process of the invention, however, substantially all of the acrolein thus taken overhead in column 23 is ultimately recovered as anhydrous acrolein as shown below.

Liquid bottoms separated within dehydration column 23 will consist essentially of an anhydrous mixture of acrolein and xylene. These liquid bottoms are passed from column 23, through line 26, into a second distillation zone comprising a stripping column 27 wherein a vapor fraction consisting essentially of anhydrous acrolein is separated from liquid bottoms consisting essentially of xylene. The vapor fraction consisting essentially of anhydrous acrolein is taken from column 27 through valved line 28 as a final product. Liquid bottoms are taken from column 27 by means of valved line 29. When the dehydration process is carried out in conjunction with a treating process employing the same hydrocarbon solvent as the dehydration process at least a part of the liquid bottoms taken from column 27 through valved line 29 are returned to the treating zone by means of valved line 14.

The vapor overhead from column 23, consisting essentially of a water-acrolein azeotropic mixture, is passed through line 32 into line 19 wherein it is mixed with the xylene-rich, aqueous, acrolein-containing xylene stream passing from column 12 into chamber 21. In this manner a substantial amount of the water emanating from column 23 will, in the presence of the excess xylene at the low temperature, be "salted out" within chamber 21. The water phase is continuously removed from chamber 21 by means of a valved line 33. It is thus seen that since all water is removed from the dehydration system through valved line 21, substantially all of the acrolein taken overhead in dehydration column 23 will ultimately emerge from the system as anhydrous acrolein overhead from column 27.

When operating the dehydration process of the invention in conjunction with a treating process wherein water is employed, at least a part of the water drawn from chamber 21 through line 33 may be returned to the treating zone by means of a valved line 34 leading into line 13.

Although the above illustrative description of the invention has stressed the use of raffinate emanating from a treating system wherein crude acrolein is treated with water and a hydrocarbon solvent, as the source of the aqueous acrolein to be dehydrated, the invention is in no wise limited to the dehydration of aqueous acrolein from any specific source. Thus, mixtures consisting essentially of acrolein and water, emanating from any suitable source may be introduced into the system by means of a valved line 36 discharging into line 19 leading into chamber 21. Such aqueous acrolein stream introduced into the system through valved line 36 may constitute a part or all of the aqueous acrolein subjected to dehydration in the process. A hydrocarbon solvent, for example, an aromatic hydrocarbon such as xylene, is introduced into the system from an outside source by means of a valved line 37. The solvent thus introduced into the system through valved line 37 will pass through lines 14 and 38 into line 19 to be admixed therein with the aqueous acrolein introduced into the system through valved line 36. The desired low temperature is maintained within chamber 21 by means of suitable cooling means such as, for example, a cooler 39 cooling the charge flowing into chamber 21 through valved line 19. Additional cooling means, not shown in the drawing, may be resorted to to aid in maintaining the low temperature range within chamber 21.

A substantial excess of hydrocarbon solvent over acrolein, on a volume basis, is preferably maintained in chamber 21. Although the amount of solvent employed may vary considerably within the scope of the invention it is preferred to maintain the ratio of hydrocarbon solvent to acrolein in the ratio range of, for example, from about 5 to 1 to about 10 to 1 by volume.

Distillation of the water from the acrolein solvent mixture within dehydration column 23 may be effected in the presence of additional amounts of solvent. Thus, a part of the hydrocarbon solvent passing through line 14 may be passed through valved line 41 into the upper part of column 23.

Although the use of xylene has been chosen in the foregoing description as the solvent employed in the dehydration of aqueous acrolein, it is to be stressed that the invention is in no wise limited to the use of this particular hydrocarbon as solvent in the acrolein dehydration operation in accordance with the invention, and that any hydrocarbon which is liquid under the conditions maintained within reaction chamber 21 and which is readily separable from acrolein by distillation, may be employed within the scope of the invention. Such suitable hydrocarbons comprise not only aromatic hydrocarbons such as xylene, toluene, and their homologues, but the paraffins, such as propane, butane, the heptanes, octanes, nonanes, decanes, etc. of branched and straight chain structure, the corresponding olefins, cycloparaffins, and cyclic olefins, as well as their homologues and hydrocarbon fractions comprising them. It will be understood that when the hydrocarbon solvent is one such as, propane or butane, which is lower boiling than acrolein, that the solvent will be taken off overhead in stripping column 27 and anhydrous acrolein obtained therein as bottoms. When using lower boiling solvents, such as, propane and butane, a portion thereof will be comprised in the water-containing overhead from column 23 passed to water separator 21. It is to be pointed out that the use of a hydrocarbon solvent thus functioning to aid in removing water overhead in column 23 is highly advantageous in that it reduces the quantity of acrolein which must be recycled to water separator 21 to effect the obtaining of a substantially anhydrous product.

It is seen that the process of the invention thus provides a highly efficient method for the dehydration of aqueous acrolein with substantially complete acrolein recovery and the use of a minimum of operative steps. Ability to use the hydrocarbons broadly as solvent in the dehydration procedure renders the process particularly advantageous in the dehydration of the aqueous-acrolein containing raffinates obtained in processes wherein crude acrolein is contacted with water in the presence of a hydrocarbon solvent.

The efficiency with which acrolein is obtained in the anhydrous state from aqueous acrolein in accordance with the invention is illustrated by the following examples:

EXAMPLE I

In a continuous acrolein dehydration, aqueous acrolein containing 2.7% by weight of water is mixed with a hydrocarbon solvent. The resulting aqueous acrolein-hydrocarbon solvent mixture is introduced into a stratification chamber wherein it is maintained at a temperature below 30° C. Separation of an aqueous phase from a supernatant aqueous acrolein-hydrocarbon phase occurs in the stratification chamber, the lower aqueous phase is continuously withdrawn from the stratification chamber and removed from the system. The supernatant aqueous acrolein-hydrocarbon phase is passed from the stratification chamber into a first distillation column wherein water is distilled therefrom as the acrolein-water azetrope leaving an anhydrous acrolein-hydrocarbon mixture as bottoms. Overhead from the first distillation column is recycled to the charge line leading into the stratification chamber wherein it is mixed with hydrocarbon solvent before entering the stratification chamber. The anhydrous liquid bottoms are passed from the first distillation column into a second distillation column. In the second distillation column anhydrous acrolein is distilled from the hydrocarbon solvent and taken overhead as a final product. Hydrocarbon solvent separated as bottoms in the second distillation column is returned to the charge line leading into the stratification chamber. In the following Table I are indicated the nature of the hydrocarbon solvent employed, conditions maintained, and the results obtained, in a plurality of separate independent operations:

*Table I*

| Run | 1 | 2 | 3 | 4 |
|---|---|---|---|---|
| Water in acrolein charge, percent by weight | 2.7 | 2.7 | 2.7 | 2.7 |
| Hydrocarbon solvent employed | xylene | xylene | ¹ TS-1 | ¹ TS-1 |
| Ratio solvent to Aq. acrolein in stratification chamber, by volume | 9 | 9 | 9 | 9 |
| Temperature in stratification chamber, °C | 0 | 20 | 0 | 20 |
| Water in hydrocarbon solvent-acrolein phase passing from stratification chamber to first distillation column in percent by weight of acrolein, on hydrocarbon-free basis | 0.71 | 0.96 | 0.35 | 0.45 |
| Water content of acrolein overhead in second distillation column percent by weight | <0.01 | <0.01 | <0.01 | <0.01 |

¹ TS-1 = a paraffinic hydrocarbon fraction boiling in the range of from 150 to 160° C.

EXAMPLE II

Acrolein containing 2.7% by weight of water is mixed with xylene in a ratio of xylene to aqueous acrolein of 9 to 1. The resulting mixture is introduced into a stratification zone and stratified at a temperature of 0° C. The resulting supernatant acrolein-xylene layer, the composition of which is indicated in column "A" of the following Table II, is subjected to distillation in a first distillation column to remove water therefrom. Composition of the overhead and bottoms obtained in the first distillation column are indicated in columns "B" and "C," respectively, of the following Table II.

*Table II*

| Composition in weight per cent | A | B | C |
|---|---|---|---|
| Acrolein | 18.0 | 91.8 | 14.1 |
| Xylene | 81.8 | 4.88 | 85.9 |
| Water | 0.208 | 3.32 | 0.0033 |

25.8% by weight of acrolein charged to the first distillation zone is taken overhead therein. All overhead from the first distillation column is combined with additional xylene, cooled, and introduced into the stratification chamber. The liquid bottoms from the first distillation column are distilled in a second distillation column to recover anhydrous acrolein overhead. Bottoms from the second distillation column consisting essentially of xylene are combined with aqueous acrolein charge to the stratification chamber. The water content of the anhydrous acrolein taken overhead from the second distillation zone is found to be less than 0.02%.

EXAMPLE III

In a continuous operation, the crude acrolein obtained by the catalytic oxidation of propylene is contacted with water in the presence of xylene in an extraction column at a temperature of 9° C. The resulting raffinate phase is found to contain a ratio of acrolein to xylene of 1 to 9 by volume and a water content of 0.83% by weight. The raffinate phase is introduced into a stratification chamber wherein it is stratified at a temperature of 21° C. resulting in the formation of a lower water layer, which is drawn continuously from the stratification chamber and removed from the system, and a supernatant acrolein-xylene layer. The supernatant acrolein-xylene layer is subjected to distillation in a first distillation column to distill water therefrom as the acrolein-water azeotrope. The water overhead from the first distillation column is cooled and returned to the stratification chamber. Bottoms from the first distillation column are distilled in a second distillation column to separate acrolein from xylene bottoms. The acrolein overhead separated in the second distillation column is found to have a water content of less than 0.02% by weight. Xylene bottoms separated in the second distillation column are returned continuously to the extraction column.

For the purpose of clarity, all parts of apparatus not essential to a complete understanding of the invention, such as, for example, pumps, condensers, accumulators, valves, tanks, etc., have been omitted from the drawing and the detailed description of the invention.

The invention claimed is:

1. The process for dehydrating aqueous acrolein which comprises admixing a hydrocarbon solvent with said aqueous acrolein, stratifying the resulting mixture at a temperature of from about 0° C. to about 30° C. in a stratification zone, thereby separating a water phase from an aqueous acrolein-hydrocarbon phase in said stratification zone, withdrawing said water phase from said stratification zone, passing said aqueous acrolein-hydrocarbon phase into a first distillation zone, separating a vapor fraction comprising water and acrolein from a liquid fraction consisting essentially of an anhydrous mixture of acrolein and hydrocarbon solvent in said first distillation zone, passing said liquid fraction from said first distillation zone into a second distillation zone, separating a vapor fraction consisting essentially of substantially anhydrous acrolein from a liquid fraction consisting essentially of hydrocarbon solvent in said second distillation zone, and passing said vapor fraction from said first distillation zone to said stratification zone.

2. The process in accordance with claim 1 wherein said liquid fraction is passed from said second distillation zone to said stratification zone.

3. The process in accordance with claim 1 wherein said hydrocarbon solvent is admixed with said aqueous acrolein to be dehydrated in a ratio of hydrocarbon solvent to aqueous acrolein of from about 5:1 to about 10:1.

4. The process in accordance with claim 1 wherein said hydrocarbon solvent is an aromatic hydrocarbon.

5. The process in accordance with claim 4 wherein said aromatic hydrocarbon is xylene.

6. The process in accordance with claim 5 wherein said xylene is admixed with said aqueous acrolein to be dehydrated in a ratio of xylene to aqueous acrolein in the range of from about 5:1 to about 10:1.

7. The process in accordance with claim 6 wherein said stratification is effected at a temperature of from about 0° C. to about 20° C.

8. The process in accordance with claim 1 wherein said hydrocarbon solvent is essentially a paraffinic hydrocarbon.

9. In a process for purifying acrolein wherein crude acrolein is contacted with water in the presence of an added hydrocarbon solvent in an extraction zone, thereby forming a raffinate phase consisting essentially of acrolein, hydrocarbon solvent and water in said extraction zone, the method of recovering substantially anhydrous acrolein from said aqueous-acrolein containing raffinate phase which comprises, stratifying said raffinate phase at a temperature of from about 0° C. to about 30° C. in a stratification zone, thereby separating a water phase from an aqueous acrolein-hydrocarbon phase in said stratification zone, withdrawing said water phase from said stratification zone, passing said aqueous acrolein-hydrocarbon phase into a first distillation zone, separating a vapor fraction consisting essentially of water and acrolein from a liquid fraction consisting essentially of an anhydrous mixture of acrolein and hydrocarbon solvent in said first distillation zone, passing said liquid fraction from said first distillation zone into a second distillation zone, separating a vapor fraction consisting essentially of substantially anhydrous acrolein from a liquid fraction consisting essentially of hydrocarbon solvent in said second distillation zone, passing said vapor fraction from said first distillation zone to said stratification zone, and returning said liquid fraction from said second distillation zone to said extraction zone.

10. The process in accordance with claim 9 wherein said hydrocarbon solvent is an aromatic hydrocarbon.

11. The process in accordance with claim 10 wherein said solvent is xylene.

12. The process in accordance with claim 9 wherein said hydrocarbon solvent is a paraffinic hydrocarbon solvent.

13. The process in accordance with claim 11 wherein said stratification is effected at a temperature in the range of from about 0° C. to about 20° C.

14. The process for dehydrating aqueous acrolein which comprises admixing a normally gaseous hydrocarbon having at least three carbon atoms to the molecule with said aqueous acrolein, stratifying the resulting mixture at a temperature of from about 0° C. to about 30° C. in a stratification zone, thereby separting a water phase from an aqueous acrolein normally gaseous hydrocarbon phase in said stratification zone, withdrawing said water phase from said stratification zone, passing said aqueous acrolein-hydrocarbon phase into a first distillation zone, separating a fraction comprising water and acrolein from a fraction consisting essentially of an anhydrous mixture of acrolein and normally gaseous hydrocarbon in said first distillation zone, passing said fraction consisting essentially of acrolein and normally gaseous hydrocarbon from said first distillation zone into a second distillation zone, separating a fraction consisting essentially of substantially anhydrous acrolein from a fraction consisting essentially of normally gaseous hydrocarbon in said second distillation zone, and passing said fraction comprising water and acrolein from said first distillation zone to said stratification zone.

15. The process in accordance with claim 1 wherein said normally gaseous hydrocarbon is admixed with said aqueous acrolein to be dehydrated in a ratio of hydrocarbon to aqueous acrolein of from about 5:1 to about 10:1.

16. The process in accordance with claim 1 wherein said normally gaseous hydrocarbon is propylene.

ROBERT M. COLE.

(References on following page)

REFERENCES CITED

The following references are of record in the file of this patent:

UNITED STATES PATENTS

| Number | Name | Date |
|---|---|---|
| 1,524,192 | Mann | Jan. 27, 1925 |
| 1,854,385 | Van Schark | Apr. 19, 1932 |
| 1,911,832 | Lewis | May 30, 1933 |
| 2,261,704 | Wagner | Nov. 4, 1941 |
| 2,404,163 | Carpenter | July 16, 1946 |
| 2,453,472 | Teter | Nov. 9, 1948 |
| 2,514,966 | Pierotti et al. | July 11, 1950 |

FOREIGN PATENTS

| Number | Country | Date |
|---|---|---|
| 609,871 | Great Britain | Oct. 7, 1948 |

OTHER REFERENCES

Chemical Engineering, December 1947, pages 107–109, article on acrolein by F. G. Watson. (Copy in Scientific Library.)